May 20, 1924.

P. DE PFYFFER

RESILIENT WHEEL

Filed May 2, 1923

Paul de Pfyffer
INVENTOR

WITNESSES
Louis Goodman
E. N. Lovewell

BY
E. G. Siggers
ATTORNEY

May 20, 1924.

P. DE PFYFFER

RESILIENT WHEEL

Filed May 2, 1923

WITNESSES
Louis Goodman
E. N. Lovewell

Paul de Pfyffer
INVENTOR

BY

ATTORNEY

May 20, 1924.

P. DE PFYFFER

RESILIENT WHEEL

Filed May 2, 1923

Paul de Pfyffer
INVENTOR

Patented May 20, 1924.

1,495,004

UNITED STATES PATENT OFFICE.

PAUL DE PFYFFER, OF KELOWNA, BRITISH COLUMBIA, CANADA.

RESILIENT WHEEL.

Application filed May 2, 1923. Serial No. 636,190.

*To all whom it may concern:*

Be it known that I, PAUL DE PFYFFER, a subject of the King of Great Britain, residing at Kelowna, in the Province of British Columbia and Dominion of Canada, have invented new and useful Improvements in Resilient Wheels, of which the following is a specification.

This invention relates to resilient wheels, and particularly to that type wherein a pneumatic tire or cushion is located between the hub and the rim, instead of between the rim and the road.

The present invention is in the nature of an improvement on the structure shown in my earlier application Serial No. 391,688, filed June 25, 1920. The general arrangement of the parts is similar to that shown in the aforementioned application, in that the hub and rim portions of the wheel are provided with overlapping relatively movable disks within which the pneumatic cushioning device is contained.

An important object of the present invention is the provision of means whereby the outer rim portion has a driving connection with the hub portion, thus enabling the vehicle supported by the wheels to be directly driven from the axle.

Another important object is the provision of a pneumatic cushion with a mantle or casing of special construction and improved means for mounting the same by means of which the wheel is rendered more practicable and more durable.

Still another object of the invention is the provision of an improved construction for mounting the brake drum so as to reduce the torsional strain and leverage on the wheel when the brake is applied, thus making it possible to secure the requisite strength by means of a lighter construction than was heretofore practicable.

The invention also includes various other improvements in the details of construction which will more fully appear from the following detailed description, taken in connection with the accompanying drawings, which illustrate the invention in its preferred form.

In the drawings:—

Figure 1:
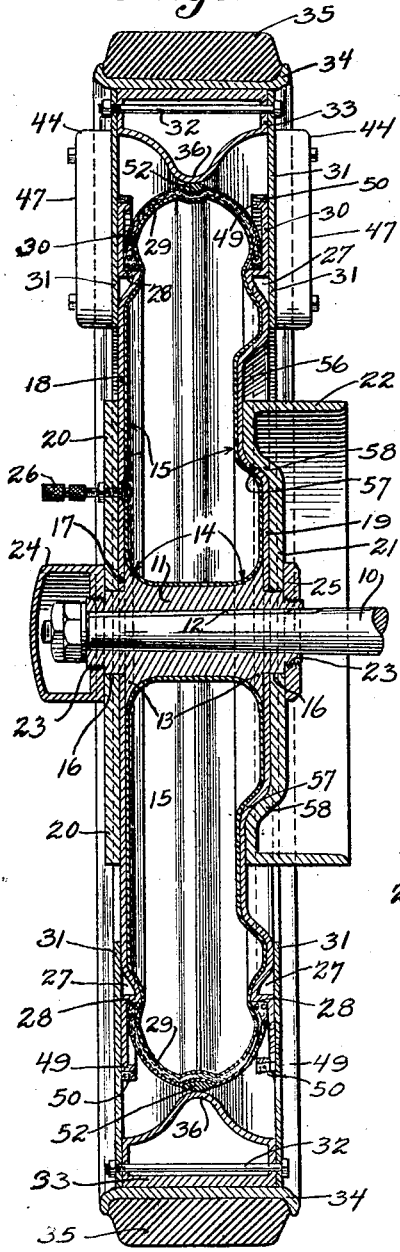
Fig. 1 is a diametric section through a wheel embodying the invention.
Figure 3:
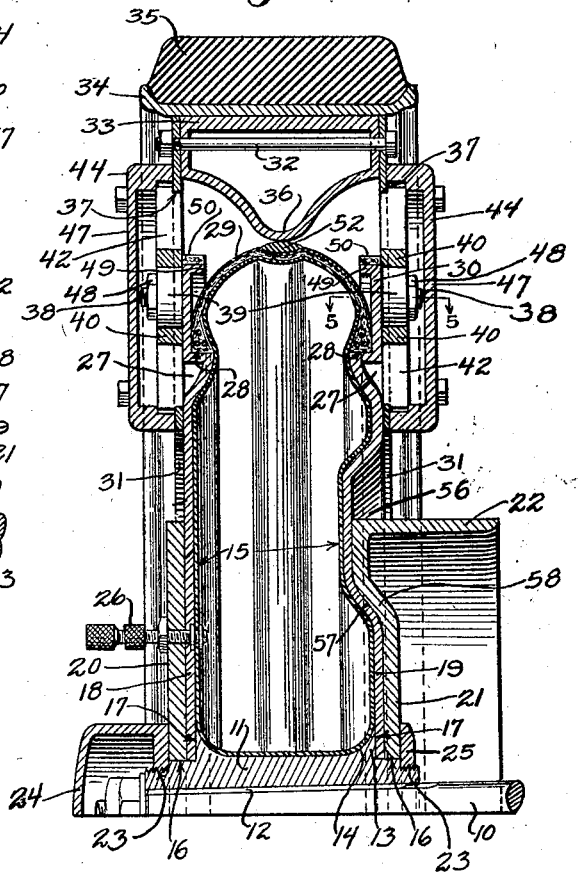
Fig. 3 is a diametric section through the upper half of the wheel taken at a different angle from Fig. 1.

Referring particularly to Figs. 1 and 3, the driving axle 10 is shown as having a hub 11 secured in driven relation thereto by a key 12. The intermediate portion of the hub is provided with two symmetrically-disposed circumferential enlargements 13 preferably formed integral therewith, and presenting opposed concave faces 14 which merge into the cylindrical portion of the hub to form a smoothly rounded seat to receive the pneumatic cushion 15. This cushion, which has a function similar to the inner tube of a pneumatic tire, extends throughout a considerable portion of the diameter of the wheel and has a comparatively small central opening to correspond with the surface of the hub upon which it rests.

The outer faces of the enlargements 13 form shoulders 17 in planes perpendicular to the axis of the hub, and the portions 16 of the hub extending beyond these shoulders are non-circular to receive disks 18 and 19 which rest against the shoulders 17. An annular plate 20 rests against the disk 18, and a plate 21 rests against the disk 19, and forms the supporting part or back of a brake drum 22. The extremities of the hub terminate in reduced threaded portions 23, one of which receives a hub cap 24 that forms a protective covering for the nuts engaging the outer threaded end of the axle 10, and also secures the plate 20 and disk 18 firmly against the adjacent shoulder 17. The other threaded end 23 receives a nut 25 which secures the brake drum supporting plate or back 21 and disk 19 firmly against the opposite shoulder 17. A valve stem 26, secured to the pneumatic cushion or inner tube 15, extends through the disk 18 and plate 20 to provide means for inflating the tire.

The disks 18 and 19 are formed near the outer extremity of the cushion 15 with inwardly-extending annular niches 27 forming shoulders or ledges 28 which provide a convenient support for the mantle or tire casing 29. The outer portions of the disks form flat annular faces 30 between which the sides of the mantle 29 are confined.

The outer portions of disks 18 and 19 are received between a pair of outer disks 31 having large central openings and connected together by bolts 32 normally in concentric relation to the hub. The disks 31 are held in spaced relation by an annular ring member 33 which may be in the form of a hollow steel casing or may be formed of hard wood or other suitable material. The ring or casing 33 is calculated to be strong enough to allow a standard steel rim 34 to be pressed on and secured in the usual way. The rim 34 is provided with a solid rubber tire 35, and in its preferred form, extends laterally beyond the disks 31, thus furnishing protection to the heads and nuts of the bolts 32. The peripheries of the disks 31 are also flush with the outer face of the casing 33 to allow the rim to be pressed on and also to prevent any strain on the bolts 32 in a radial direction in case the air cushion becomes deflated.

The inner side of the casing 33 is concaved and bent inwardly and formed into a relatively narrow convex portion 36 projecting diametrically toward the hub and forming a seat which rests upon the pneumatic casing 29 to support the outer rim 34 and solid rubber tire 35.

It is to be understood that the outer disks 31 are freely slidable on the inner disks 18 and 19, in order to permit the full cushioning effect of the pneumatic cushion 15. In order to permit this relative sliding movement and at the same time to maintain a driving relation between the hub and outer rim, I have provided a connection between the disks 31 and disks 18 and 19 of special construction, which will now be described.

Figure 5:
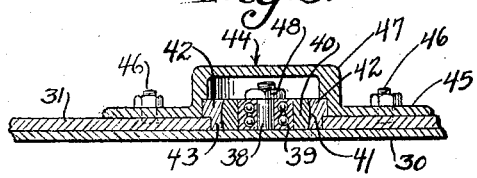
Fig. 5 is a sectional detail view on the line 5—5 of Fig. 3.

Each of the outer disks 31 is provided with a slot 37 wide enough to receive a driving pin 38, Fig. 5, and certain anti-friction means which will be presently described, said slot being also long enough, radially, to permit the desired play between the rim section and hub in response to the yielding of the pneumatic cushion. The pins 38 are secured to the annular portions 30 on the inner disks preferably by spot welding or equivalent means.

Upon the pin 38 is mounted a ball or roller bearing sleeve 39 frictionally maintained within a rectangular bearing case 40, said case having its outer edges convex to ride in concave grooves 41 formed in the inner edges of spaced guide plates 42. Each of these guide plates is shouldered on its longitudinal edge, forming a reduced portion 43 seated within the slot 37 of the disk 31, while the other or enlarged portion of the guide plate 42 is seated within a longitudinal socket formed in a cover 44.

The cover 44 comprises a flat plate 45 of rectangular shape secured to the disk 31 by means of bolts 46, and has a raised portion 47 centrally located and forming a chamber for the reception of the guide plate 42, the end of the driving pin 38 and its securing nut 48. As shown in Fig. 5 the nut 48 is sufficiently large to engage the ball bearing sleeve 39 and prevent the same from slipping off from the pin 38.

The cover 44 performs a triple function, in that it is adapted to firmly maintain the guide 42 for the square case 40 in position; it forms a protecting cover for the slot 37 to prevent dust or foreign matter from entering the interior of the wheel; and it reinforces the disk 31 at the point where the slot 37 is formed. Furthermore, the chamber in the cover is adapted to retain a certain amount of lubricating oil, whereby the driving pin and its associated parts will be thoroughly lubricated and wear on the same will thus be reduced to a minimum.

Thus, it will be seen that the inner disks 18 and 19 are firmly secured to the axle; that is, they are held not only in concentric position relative to the axle, but also firmly keyed thereto, and through the medium of the pin 38, transmit the driving power to the rim of the wheel. This pin 38 not only serves as a means for forcing the rim section to follow the revolutions of the axle, but also provides a pivot about which the disks 31 swing in response to the yielding of the pneumatic cushion as the wheel revolves and the weight is constantly transferred along the circumference of the wheel.

The outer edges of the disks 18 and 19 are turned inwardly to form flanges 49 which reinforce the disks and also, provide supports for buffers 50 of rubber or other yieldable material, on which the inner edges of the casings 33 may ride in case the pneumatic cushion should become deflated.

Figure 6:
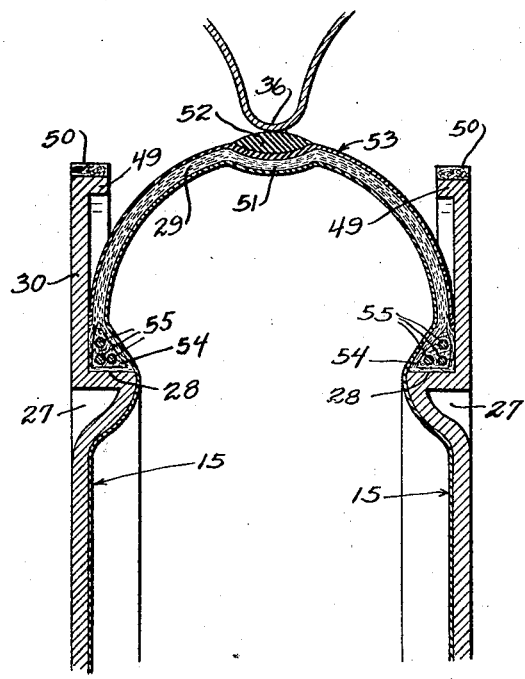
Fig. 6 is a detail sectional view on an enlarged scale showing the mantle or tire casing and parts associated therewith.
Figure 7:
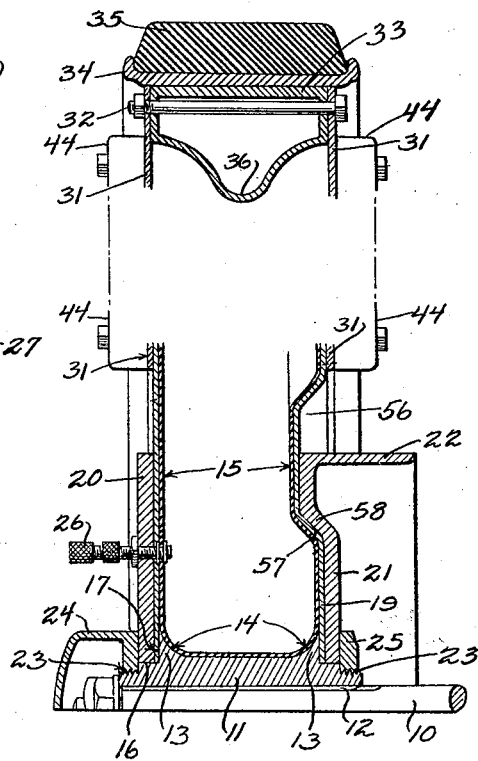
Fig. 7 is a diametric section of the upper part of the wheel with parts omitted or shown diagrammatically, for the sake of clearness.

In the operation of the wheel, the cushioning surface of the mantle or casing 29 which receives the inwardly-projecting convex portion 36 of the rim casing is of comparatively small extent laterally, and in order to obtain the best results and insure the durability of the casing, I have constructed the latter as shown best in Fig. 6. In this construction, the casing, which is made of the usual vulcanized fabric or cord, is formed centrally with an inwardly bent portion 51, around the outer face of which is secured a tread 52 of tough rubber which is lens-shaped in cross section with its inner convex face concentric with the inwardly-curved face 51. The result of this construction is that the outer rubber facing 53, as well as the unstretchable reinforcement fabric or cord of the casing, assumes already an inwardly-bent position when the casing is manufactured, and consequently they are never subjected to any considerable stretching strain, no matter how deeply the contacting portion of the casing 33 may be pressed into the cushion. Without this special form of casing, there would be a constant stretching and wearing of the fabric which would injure the casing.

The casing 29, which performs the same function as the outer casing of the usual type of pneumatic tire, may be retained on the wheel in any of the several ways customarily employed in connection with pneumatic tires. In the preferred construction, the casing is of the straight sided type having unstretchable beads 54 which rest on the ledges 28 and are held against the lateral spreading by the straight portions 30 of the disks 18 and 19. The beads 54, as shown, have one or more wires 55 inlaid or embedded therein, each wire forming an unstretchable ring serving to hold the beads against stretching and maintain them in close relation to the ledges 28 and concentric to the wheel axle.

One of the inner disks, as 19, is formed with a concentric annular channel 56, the inner side of which forms a sloping seat 57 against which rests the correspondingly sloping portion 58 of the brake drum 22. By this construction, the brake drum is placed nearer to the center plane of the wheel, thus reducing torsional spread and leverage on the wheel when the brake is strongly applied, the braking power being applied directly to the hub section and transted therefrom to the rim section by means of the pin 38.

Figure 4:
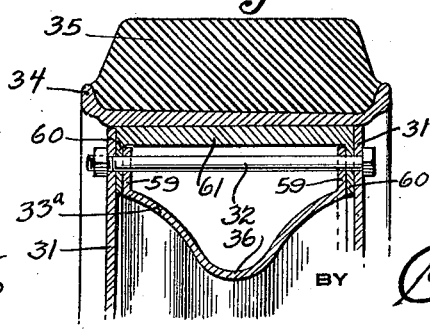
Fig. 4 is a detail sectional view of the rim, illustrating a modified form.

In Fig. 4, I have shown an outer rim casing 33ª of modified construction, wherein the same is made in two parts, the inner portion having radially-extending flanges 59 which are received within corresponding flanges 60 extending inwardly from the outer rim or felly 61, the entire casing being secured between the disks 31 by the bolts 32 which pass through the disks and through registering perforations in the flanges 59 and 60.

Figure 2:
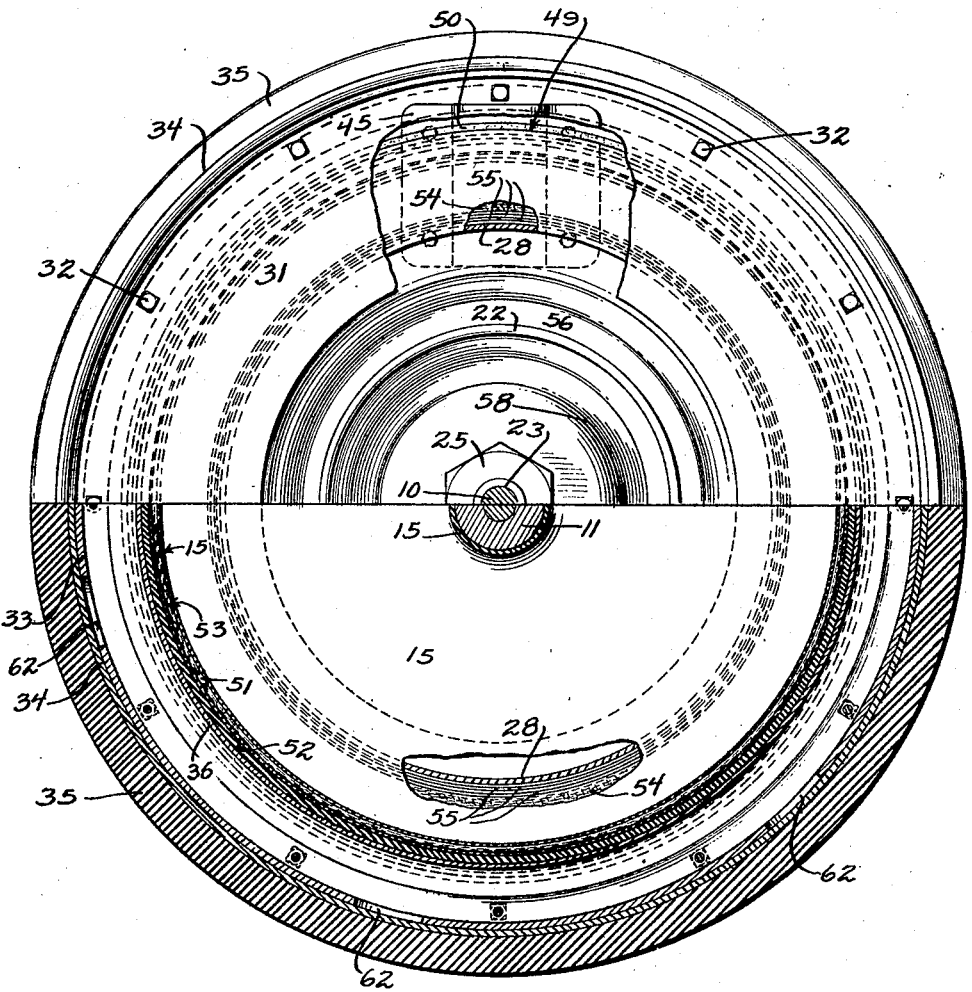
Fig. 2 is a view partly in side elevation and partly in section of the improved wheel.

Either form of rim casing 33 or 33ª may be made from any suitable material, and if the single piece casing 33 is cast, spaced apertures as shown at 62 in Fig. 2, may be provided for facilitating the removal of the sand.

The driving pin 38 serves also as a guide for all movements of the rim setion toward or away from the axle during the forward travel of the wheel, and the whole rim section is allowed to swing freely around this driving pin as a pivot, being held against movement toward and away from the axle only by the resiliency of the pneumatic cushion 15.

The length of the slots 37 is calculated to allow the desired resiliency, and in case the pneumatic cushion becomes deflated, injury to the casing 29 will be prevented by the limiting flanges 49, and the effect of the vibrations of the rim will still be somewhat cushioned by the resilient facing 50 which prevents the steel casing 33 from coming in contact with the steel flanges 49.

It will be particularly noted that the connection between the outer and inner disks is obtained by means of a single driving pin on each side of the wheel, said pin being secured to either the inner or outer disk and loosely extending through a suitable bearing secured to the adjoining disk. It will be obvious that this feature of the invention is equally applicable to the structure shown in my former application above referred to, as well as to other resilient wheels having an inner and an outer pair of radially overlapping disks which are arranged so as to allow radial and tangential play of one pair relative to the other pair.

The ledges 28 on which the mantles are seated are located substantially midway between the hub and the rim, so that the inner tube 15 projects inwardly considerably beyond the mantle. By this means, the proper ratio between the air volume of the inner tube and the bearing surface of the same is maintained.

While I have shown and described, specifically, the details of construction by means of which my invention is carried out, it is to be understood that this is merely illustrative, and that numerous modifications may be made therein so long as such modifications mark no material departure from the salient features of the invention, as expressed in the appended claims.

What is claimed is:—

1. A resilient wheel including a hub, a pair of inner disks mounted on said hub, a pair of outer disks secured together and movable relatively to the inner disks but held against rotation about the wheel axis relatively to the inner disks, a casing secured to the outer disks and having an inwardly-projecting convex part throughout the entire circumference, and a resilient cushion mounted on said hub between the inner disks and including a mantle bearing against the convex part of said casing.

2. In a resilient wheel, the combination with a hub, of an inner and outer pair of radially overlapping disks disposed in planes perpendicular to the axis of the hub and normally concentric but independent from each other so as to allow radial and tangential play of one pair relative to the other pair, a connection between the outer and inner disks consisting of a single pin connected to one disk and a bearing slidably mounted in a slot of the adjoining disk, the pin working in said bearing, a cushion mounted between the inner disks and bearing upon the hub, and means connecting the outer disks and bearing upon the cushion between the inner disks.

3. A resilient wheel including an axle-supported hub, a pair of disks mounted on said hub, a second pair of disks secured together, a casing secured to the second pair of disks, a resilient cushion mounted on said hub between the inner disks and bearing against a portion only of the inner service of said casing, a driving member for driving one pair of disks, a pin mounted on one of a pair of said disks, and a movable bearing for said pin mounted on one of the other pair of said disks.

4. A resilient wheel including an axle-supported hub, a pair of disks mounted on said hub, a second pair of disks secured together, a casing secured to the second pair of disks, a resilient cushion mounted on said hub between the inner disks and bearing against a portion only of the inner surface of said casing, a driving member for driving one pair of the disks, a radial slot in one of a pair of said disks, a cover plate enclosing said slot, a guide mounted in the cover plate, a pin mounted on one of the other pair of said disks, and a ball bearing ring mounted on the pin and slidable in the guide.

5. A resilient wheel including an axle-supported hub, a pair of inner disks mounted on said hub, a pair of outer disks normally supported in concentric relation with the inner disks, a casing secured to and between the outer disks, a resilient cushion mounted on said hub between the inner disks and bearing against a portion only of the inner surface of said casing, a driving member for driving one pair of the disks, a pin mounted on a disk and projecting through a slot in an adjacent concentric disk, and a ball bearing ring mounted on the pin and slidable in said radial slot.

6. A resilient wheel including an axle-supported hub, a pair of disks mounted on said hub, a second pair of disks secured together, a casing secured to the second pair of disks, a resilient cushion mounted on said hub between the inner disks and bearing against a portion only of the inner surface of said casing, a driving member, a radial slot in one of a pair of disks, a cover plate enclosing said slot, a radial guide mounted in the slot and locked in position on said disk by said cover plate, the inner longitudinal edges of the guide being provided with concave grooves, a pin mounted on one of the other pair of disks, a centrally perforated bearing casing having its opposite edges convex and slidable in the concave grooves of the guide, and a ball bearing ring mounted on the pin and fitted in the perforation in the slidable bearing casing.

7. A resilient wheel including an axle-supported hub, said hub having a reduced screw-threaded section at each end and integral shoulders located intermediate its ends, said shoulders having their adjacent faces concave, a pair of disks mounted on said sections and held in position against said shoulders by nuts engaging said screw threads, a pneumatic cushion comprising an inflatable tube mounted on the hub between said disks, a housing enclosing the cushion and disks, the concave faces of the shoulders merging into the peripheral surface of the hub and the adjacent faces of the disks to protect the pneumatic cushion from bending too sharply.

8. A resilient wheel including a housing and a pneumatic annular cushion mounted within the housing, said housing including a pair of spaced disks coaxially mounted and having inwardly-projecting ledges, and a mantle surrounding the peripheral portion of said cushion and having straight sides held against the respective disks and terminating in beads which are seated upon said ledges.

9. A resilient wheel including an axle-supported housing, a resilient cushion enclosed by said housing and having a mantle for protecting the outer portions thereof, said housing including a pair of spaced disks with inwardly-projecting concentric ledges, and a ring having an inwardly-projecting convex portion throughout its circumference, the crown of said inwardly-convex portion bearing against the resilient cushion covered by the mantle, the inner edges of the mantle having straight sides terminating in beads which rest upon said ledges whereby a three-point contact between the mantle and the housing is provided.

10. A resilient wheel including a housing, a resilient cushion and a mantle therefor enclosed by the housing, said cushion and mantle being transversely convex on their peripheral portion, the housing including spaced disks formed with integral inwardly-projecting ledges, and a relatively slidable ring having an inwardly-projecting portion engaging the convex portion of the cushion and mantle, said mantle having straight sides held between the disks and terminating in beads seated upon said ledges, the crown of the cushion and mantle sustaining a thrust from the crown of the inwardly-projecting portion when a load is put upon the wheel.

11. A resilient wheel including an axle-supported hub, a pair of inner disks mounted on said hub, each disk provided with an inwardly-projecting flange at its outer edge forming a support for a mantle, a pair of outer disks normally in concentric relation with the inner disks, an annular ring member secured to and between the outer disks and provided with an annular inwardly-projecting convex portion, and a resilient cushion held between the inner disks and provided with a peripheral mantle resting on said flanges and in engagement with the convex portion of the ring member.

12. A resilient wheel including an axle-supported casing, and a resilient cushion comprising a mantle and an inner tube, said mantle protecting the outer periphery of the inner tube, said casing including spaced disks having inwardly-projecting ledges and a peripheral ring having a portion inwardly convex throughout its entire circumference, the crown of said inwardly-convex portion bearing against the resilient cushion covered by the mantle when a load is put upon the wheel, the side edges of the mantle being straight and terminating in beads seated upon said ledges and held against lateral spreading by said disks, said inner tube being enclosed by the hub, disks and mantle whereby it extends further inwardly toward the center of the wheel than the side edges of the mantle to give the proper ratio between the air cushion and the bearing surface of the resilient cushion on the inwardly-convex portion of the casing.

13. A resilient wheel including an axle-supported hub, a pair of inner disks mounted on said hub, a pair of outer disks secured together and movable relatively to the inner disks, a ring secured to the outer disks and having an inwardly-projecting convex part throughout its entire circumference, a resilient cushion mounted on said hub between the inner disks and including a mantle, said mantle having its central portion bent inwardly to form a concave outer surface and a double convex tread portion secured to the concave surface and bearing against the convex part of the ring.

14. A resilient wheel including an axle-supported housing, a resilient cushion within the housing and provided with a mantle for protecting the outer portions thereof, said housing including inwardly-projecting concentric ledges, and a ring having a portion inwardly convex throughout its entire circumference, the crown of said inwardly-convex portion bearing against the mantle when a load is put upon the wheel, the inner edges of the mantle having straight sides terminating in beads which are seated on said ledges, the intermediate portion of said mantle being bent inwardly to form a concave outer surface, and a double convex tread portion secured to the concave surface and bearing against the convex part of the ring.

15. A resilient wheel including an axle-supported housing and a resilient cushion comprising a mantle and an inner tube, said mantle protecting the outer periphery of the inner tube, said housing including a ring having a portion inwardly convex throughout its entire circumference, the crown of said inwardly-convex portion bearing against the resilient cushion covered by the mantle when a load is put upon the wheel, said mantle having its central portion bent inwardly to form a concave outer surface, and a double convex tread portion secured to the concave surface and forming a surface against which the ring bears, the side portions of the housing having inwardly-projecting ledges substantially midway between the axle and the outer periphery of the wheel which form a support for the mantle whereby said inner tube extends further inwardly towards the center of the wheel than the side edges of the mantle to give the proper ratio between the air volume and the bearing surface of the resilient cushion on the inwardly convex portion of the ring.

16. An outer casing for pneumatic tires and the like having straight sides terminating in beads which are substantially unstretchable and having its central portion bent inwardly to form a concave outer surface, and a double convex tread portion of gum rubber vulcanized to the concave surface to form a bearing surface.

17. A resilient wheel comprising a hub, a pair of inner disks mounted on the hub, a pair of outer disks normally concentric with the inner disks and movable relatively thereto, a casing secured between the outer disks, a resilient cushion mounted between the inner disks, hub and casing, one of the inner disks having a concentric channel in its outer face, and a brake drum secured to the hub and having a portion shaped to fit into said channel and rest against the inner face thereof whereby to reduce the torsional strain and leverage on the wheel when the brake is applied.

18. A resilient wheel including an axle-supported housing, and resilient means including a resilient cushion and a mantle for protecting the outer portions thereof, said housing including a ring having a portion inwardly covex throughout its entire circumference, the crown of said inwardly-convex portion bearing against the resilient cushion covered by the mantle when a load is put upon the wheel, said housing also including a pair of spaced disks between which the cushion and mantle are held, and a pair of relatively movable disks between which the ring is secured, the outer face of the ring being flush with the peripheries of the disks, and a rim secured to the outer face of the ring and projecting beyond the faces of the disks.

In testimony that I claim the foregoing as my own, I have hereto affixed my signature.

PAUL DE PFYFFER.